(12) United States Patent
Stottan et al.

(10) Patent No.: US 11,350,195 B2
(45) Date of Patent: May 31, 2022

(54) HEADREST AND SEAT COMPRISING SAID HEADREST

(71) Applicant: Audio Mobil Elektronik GmbH, Ranshofen (AT)

(72) Inventors: Thomas Stottan, Braunau am Inn (AT); Thomas Hatheier, St. Peter am Hart (AT); Richard Frei, Braunau am Inn (AT)

(73) Assignee: Audio Mobil Elektronik GmbH, Ranshofen (AT)

( * ) Notice: Subject to any disclaimer, the term of this patent is extended or adjusted under 35 U.S.C. 154(b) by 0 days.

(21) Appl. No.: 16/490,738

(22) PCT Filed: Mar. 1, 2018

(86) PCT No.: PCT/EP2018/055118
§ 371 (c)(1),
(2) Date: Sep. 3, 2019

(87) PCT Pub. No.: WO2018/158406
PCT Pub. Date: Sep. 7, 2018

(65) Prior Publication Data
US 2020/0021900 A1    Jan. 16, 2020

(30) Foreign Application Priority Data
Mar. 1, 2017   (EP) ..................... 17158778

(51) Int. Cl.
*H04R 1/02*   (2006.01)
*H04R 1/40*   (2006.01)
*H04R 3/12*   (2006.01)

(52) U.S. Cl.
CPC ............. *H04R 1/025* (2013.01); *H04R 1/403* (2013.01); *H04R 3/12* (2013.01); *H04R 2400/11* (2013.01); *H04R 2499/13* (2013.01)

(58) Field of Classification Search
CPC .......... H04R 1/025; H04R 1/403; H04R 3/12; H04R 5/023; H04R 2400/11; H04R 2499/13; B60R 2011/0017; B60R 11/0217; B60N 2/879
See application file for complete search history.

(56) References Cited

U.S. PATENT DOCUMENTS

| 3,962,544 A * | 6/1976 | Kobayashi | ........... H04R 1/2865 |
| | | | 381/342 |
| 2007/0230738 A1 | 10/2007 | Royse | |
| 2007/0261911 A1 * | 11/2007 | Nichols | ................ H04R 1/2826 |
| | | | 181/150 |
| 2013/0287246 A1 | 10/2013 | Sasaki et al. | |

(Continued)

FOREIGN PATENT DOCUMENTS

| CN | 104428162 A | 3/2015 |
| DE | 202009001616 U1 | 6/2009 |
| WO | 9301951 A1 | 2/1993 |

(Continued)

*Primary Examiner* — Ping Lee

(57) ABSTRACT

A headrest (1, 101, 102) is disclosed, with a support structure (2) and with at least one speaker basket (7.1, 7.2) for a speaker (6.1, 6.2) provided on the support structure (2). In order to achieve a simply designed and durable headrest (1, 101, 102), the proposed support structure (2) transitions integrally into the speaker basket (7.1, 7.2) and forms the latter.

20 Claims, 4 Drawing Sheets

(56) References Cited

U.S. PATENT DOCUMENTS

2016/0137106 A1* 5/2016 Subat .................... B60N 2/879
                                                                381/389

FOREIGN PATENT DOCUMENTS

| WO | 2011127289 A1 | 10/2011 |
| WO | 2015071195 A1 | 5/2015 |
| WO | 2016022238 A1 | 2/2016 |

* cited by examiner

HEADREST AND SEAT COMPRISING SAID HEADREST

FIELD OF THE INVENTION

The invention relates to a headrest with a support structure and with at least one speaker basket for a speaker provided on the support structure.

BACKGROUND OF THE INVENTION

Headrests with a support structure are known from the prior art (WO93/01951A1), which have a mount with mounting elements for fastening supports to the support structure In order to be able to integrate speakers into the headrest, the support structure is provided with recesses in which speakers are provided. Such recesses in the support structure, however, weaken the stability of the headrest and result in a reduced rigidity and durability. In addition, such headrests have a comparatively high installation cost.

SUMMARY OF THE INVENTION

The object of the invention, therefore, is to simplify the design of a headrest of the type described at the beginning and to increase its durability.

If the support structure transitions integrally into the speaker basket and forms the latter, it is then possible to achieve a headrest with a particularly simple design that can also have a high mechanical stability and rigidity and that enables a reliable fastening of both the speaker and the headrest. A support structure that transitions integrally into the speaker basket and also forms it specifically results in a one-piece design. This can make it possible to achieve a particularly easy-to-manufacture support structure for the headrest, for example by means of injection molding. Other production processes such as deep drawing and lamination are also possible.

In addition, this one-piece, transitioning embodiment can further increase the durability of the headrest since the speaker baskets in the form of a ribbing in the support structure can improve the stiffness of the headrest.

The headrest according to the invention is thus not only simply designed, but also has a high mechanical durability.

The headrest can be fastened to a support in a user-friendly way if the headrest has a mount, which has at least one mounting element for fastening the headrest to a support. In this case the support can be a support rod, a seat back, or also a support profile and can simultaneously enable a reliable fastening of the headrest to a seat, for example a vehicle seat.

The design of the headrest can also be further simplified if the speaker basket supports the mounting element for fastening the support. This can also improve the accessibility of the mounting elements, which can facilitate the maneuvering of the headrest during installation.

A particularly compact headrest can also be achieved if the mounting element adjoins the back side of the speaker basket. This placement of the mounting element also does not require any consideration of possible lateral openings of the speaker basket for the sake of ensuring acoustic parameters in the sound output.

If the support structure transitions integrally from the speaker basket into the mounting, element and forms the latter, this one-piece design makes it possible to further simplify the design complexity of the headrest. By forgoing additional mounting elements and additional mounting material, it is also possible to achieve a headrest that is simple from a production engineering standpoint. In general, it should also be noted that the mounting elements can advantageously be integrally formed by the support structure.

The reliability of the fastening of the support to the support structure can be further increased if the mounting element forms a snap clip for accommodating and fastening the support.

If the speaker basket supports several mounting elements for fastening the support, this can further increase the durability of the mechanical connection.

A particularly advantageous headrest can be achieved if the support structure transitions integrally into two speaker baskets and forms the latter, which speaker baskets are positioned in opposite edge regions of the support structure. Through the particularly symmetrical design of the support structure, even higher loads can be transferred and a particularly durable headrest can be achieved.

The design of the headrest can be further simplified if the speaker baskets each support the mounting element or at least one mounting element for fastening the support.

The stability and thus the durability of the headrest can be further increased if the support structure has at least one reinforcing rib, which forms a third mounting element for fastening the support. These reinforcing ribs can preferably be integrally formed out of the material of the support structure in order to achieve a particularly rigid support structure.

If the third mounting element is positioned between the two mounting elements of the speaker baskets, then by means of the third mounting element, not only can a more reliable fastening of the support to the support structure be provided, but also the stability of the support structure can be further increased since the support can function as an additional reinforcing element in the support structure.

The invention can particularly excel if the headrest has at least one support for fastening the headrest to a seat, in particular a vehicle seat.

If the support extends in a loop shape from the first speaker basket to the second speaker basket and is fastened to their mounting elements, it is possible to achieve a particularly reliable connection between the support and the support structure.

The headrest according to the invention can be particularly suitable for a seat, in particular a vehicle seat.

BRIEF DESCRIPTION OF THE DRAWINGS

The subject of the invention is shown in greater detail by way of example in the figures, based on a plurality of embodiment variants. In the drawings.

DETAILED DESCRIPTION OF THE PREFERRED EMBODIMENTS

Figure 1:
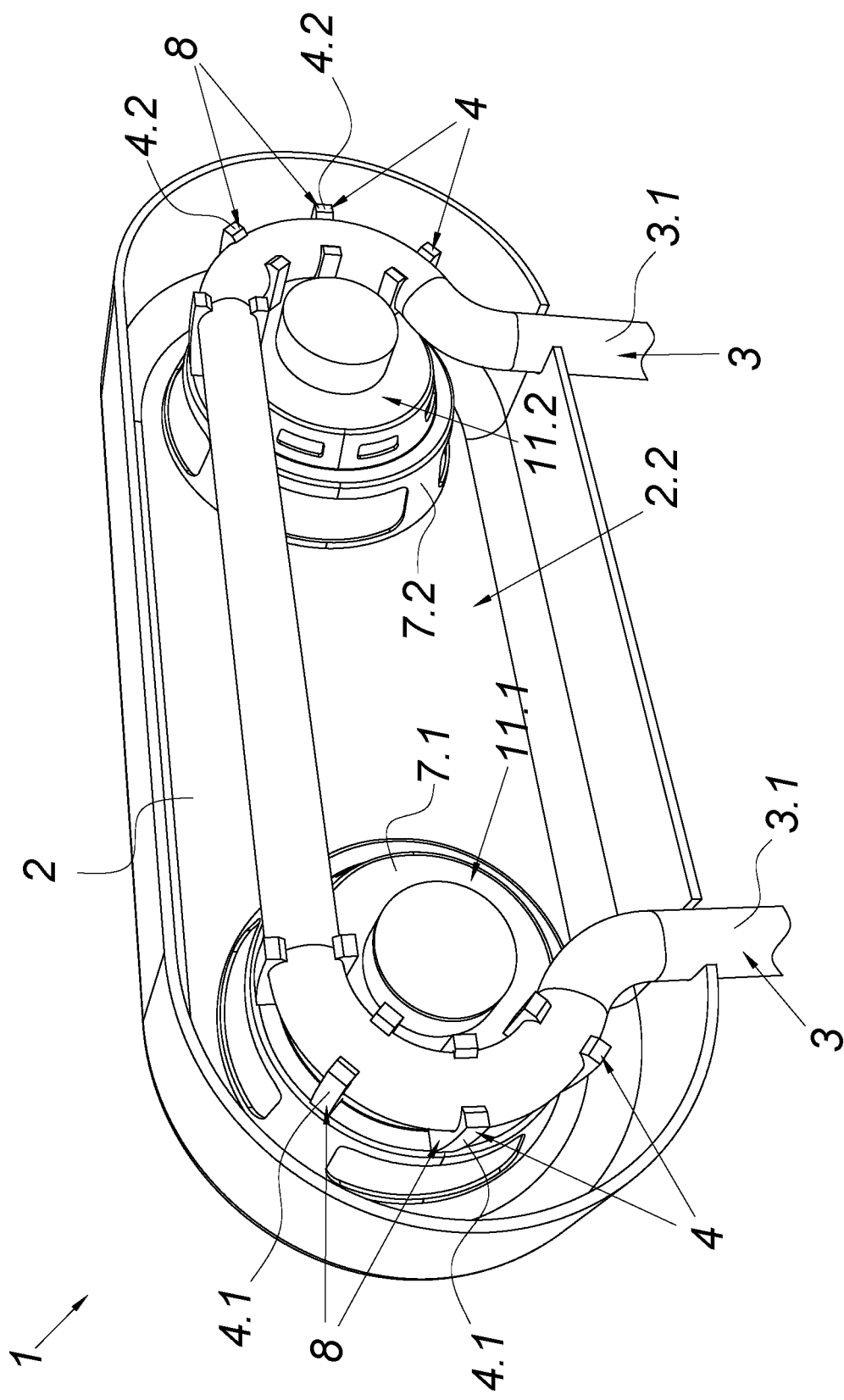
FIG. 1 shows a rear view of a headrest according to the invention in a first embodiment.
Figure 2:
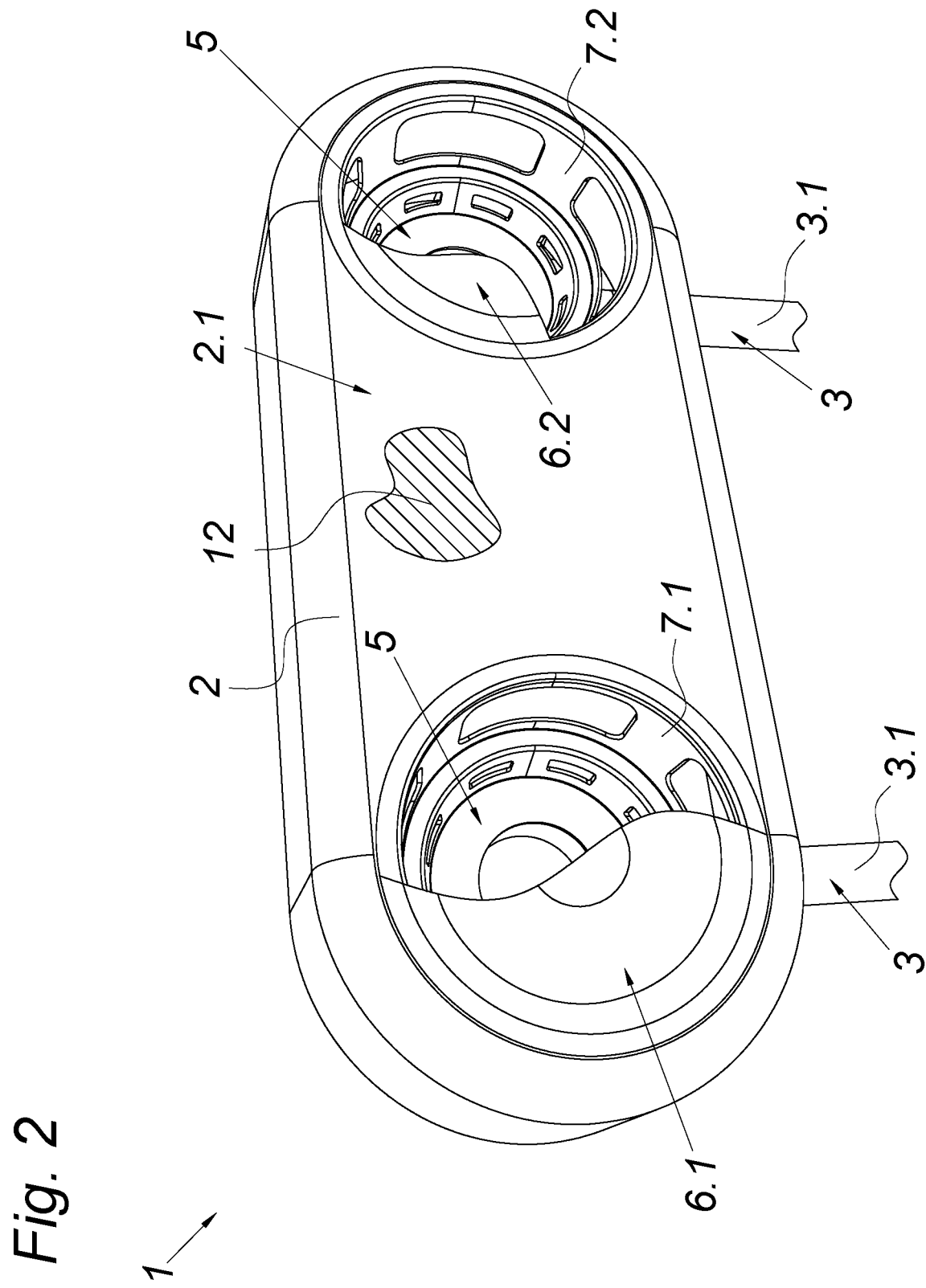
FIG. 2 shows a front view of the headrest from FIG. 1.

FIG. 1 shows a headrest 1 according to the invention for a vehicle seat with a support structure 2 according to the first exemplary embodiment. The support structure 2 is provided with a support body 12 which is indicated in FIG. 2, for example composed of foam, for supporting the head of a person sitting in the vehicle seat. The support body 12 is positioned on the front side 2.1 of the support structure 2.

The headrest 1 also has a mount 4, which has at least one mounting element 4.1, 4.2 and is embodied to accommodate a support 3. The support 3 is used for fastening the headrest 1 to a vehicle seat. The mount 4 in this case has several mounting elements 4.1, 4.2, which connect the support 3 to the support structure 2 in a frictional and form-fitting way. As is clear from FIGS. 1-3, the support 3 is preferably embodied in the form of a support rod 3.1.

As can be inferred from FIG. 2, the support structure 2 has two receptacles 5 to permit speakers 6,1, 6.2 to be provided therein. In particular, the receptacles 5 can be viewed as speaker baskets 7.1, 7.2, which are thus provided in the support structure 2. In this connection, it should be noted that naturally, the support structure can have only one recess S for a speaker 6.1 or 6.2—but this is not shown.

The speaker baskets 7.1, 7.2 in this case are embodied by the support structure 2 according to the invention in that the support structure 2 transitions integrally into the speaker baskets 7.1, 7.2, which achieves a one-piece design and yields a seamless and smooth support structure. In this region of the headrest 1, the speaker baskets 7.1, 7.2 can thus simultaneously also serve—like most of the rib structures otherwise found there—as a reinforcement of the support structure 2 and thus function as a stability-enhancing element of the support structure 2. The speaker baskets 7.1, 7.2 are positioned on the back side 2.2 at the support structure 2.

It is particularly preferable for the support structure 2 in this case to form two speaker baskets 7.1, 7.2, which are positioned in opposite edge regions of the support structure 2. In this case, the support 3 in the form of a support rod 3.1 extends in a loop shape from the first speaker basket 7.1 to the second speaker basket 7.2 and is fastened to their mounting elements 4.1, 4.2. The support structure 2 can also be fastened to several, preferably two, support rods 3.1, which is not shown in detail.

In this case, the speaker baskets 7.1, 7,2 are integrally formed out of the support structure 2, which achieves a particularly rigid support structure 2. On the one hand, the transitioning of the support structure 2 into the speaker baskets 7.1, 7.2 can facilitate the mounting of the speakers 6.1, 6.2 and on the other hand, the integrally formed speaker baskets 7.1, 7.2 can, as a structural element, increase the rigidity of the support structure 2. On the back side 11.1, 11.2 of the speaker baskets 7.1, 7.2, mounting elements 4.1, 4.2 are also provided, which produce a fictionally engaging connection between the support 3 and the support structure 2. In this case, the speakers 6.1, 6.2, each in the thrill of a cartridge, for example, can be inserted from the from into the respective receptacles 5 and fastened therein, which achieves particularly simple mourning conditions.

Figure 3:
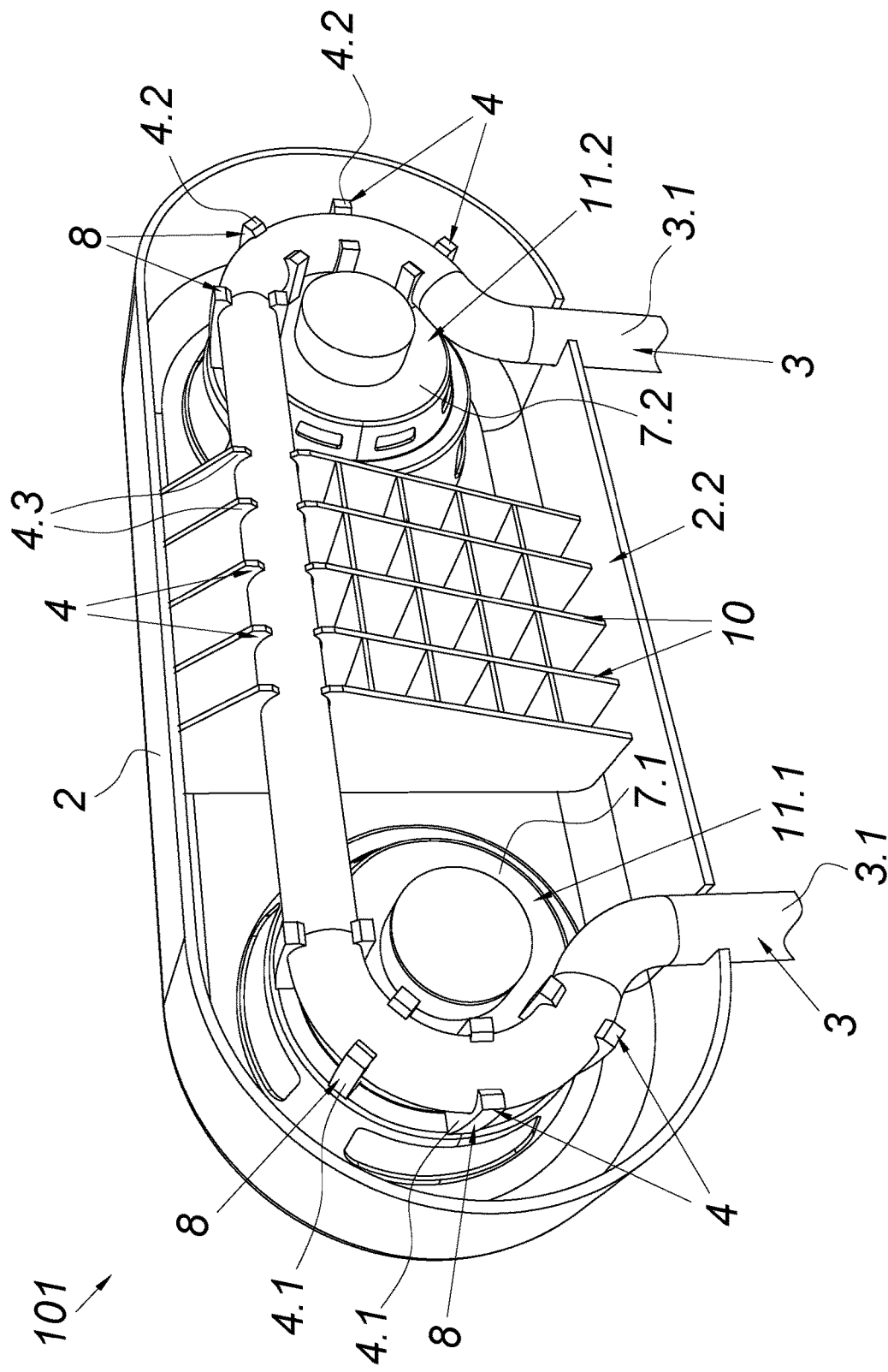
FIG. 3 shows a rear view of a headrest according to the invention in a second embodiment.

As is clear from FIGS. 1 and 3, the mounting elements 4.1, 4.2 adjoin the back side 11.1, 11.2 of the speaker baskets 7.1, 7.2. In a preferred embodiment, the support structure 2 can transition into the mounting elements 4.1, 4.2, 4.3, in this case, the mounting elements 4.1, 4.2, 4.3 are in particular integrally formed by the support structure 2. In this case, the mounting elements 4.1, 4.2, 4.3 are formed together with the support structure 2 directly during production in order to achieve a particularly compact support structure 2. It is equally conceivable, however, for the mounting elements 4.1. 4.2 to be subsequently provided on the back side 11.1, 11.2 of the speaker baskets 7.1, 7.2.

As can also be inferred from FIGS. 1 and 3, the mounting elements 4.1, 4.2, 4.3 preferably form snap clips 8 for accommodating and fastening the support 3. In this case, the snap clips 8 have a resilient, automatically snapping nature, which permits a tool-free mounting of the support 3 in the form of the support rods 3.1 on the support structure 2. In this case, the headrest according to the invention 1 can feature particularly simple production conditions.

In another embodiment of the headrest 101, FIG. 3 shows that reinforcing ribs 10 are provided on the support structure 2, which is how this headrest 101 differs from the headrest 1 according to FIG. 1.

In addition to the formed speaker baskets 7.1, 7.2, the reinforcing ribs 10 offer an additional reinforcement of the support structure 2, which allows them to withstand high mechanical loads. In addition, third mounting elements 4.3 are provided on the reinforcing ribs 10 in order to thus enable an additional fastening of the support 3 and to achieve a stiffening of the support structure 2. The reinforcing ribs 10—and thus the third mounting elements 4.3—are positioned between the mounting elements 4.1, 4.2 of the speaker baskets 7.1, 7.2.

Figure 4:
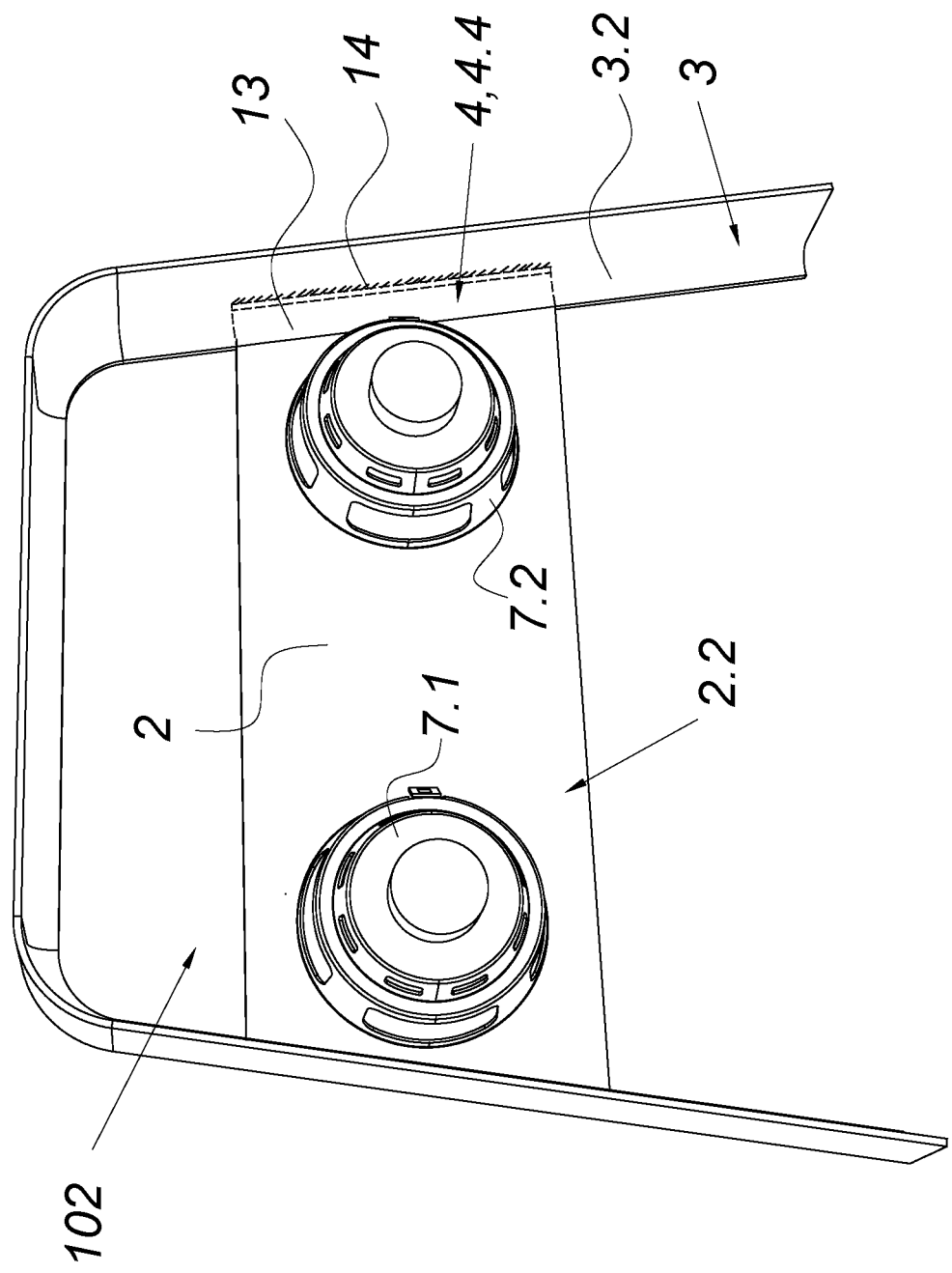
FIG. 4 shows a rear view of a headrest according to the invention in a third embodiment.

The headrest 102 shown in FIG. 4 differs from the headrests 1, 101 shown in FIGS. 1 to 3 essentially in the region of the mount 4. Specifically, the support structure 2 of the headrest 102 has mounting elements 4.4 in the form of tabs 13. These, tabs 13, which are each provided at an end of the support structure 2 (only the right tab 13 of these tabs 13 is visible in FIG. 4), fasten the headrest 102 to a support 3, namely a seat back 3.2,—for example by means of an integrally bonded connection, preferably a welded connection 14. A different connection such as a snap connection, a screw connection, a rivet connection, etc, is also conceivable.

As shown by way of example on the left between the support structure 2 and the support 3 in FIG. 4, in an alternative embodiment, the support structure 2 of the headrest 102 can, also transition integrally into the support 3. Tabs 13 or other holding elements are therefore not needed. Such a one-piece design is conceivable, for example, in a seat with a shell construction, in which the headrest 2 and the seat back 3.2 are embodied of one piece.

As is known, suitable materials for the support structure 2 include plastic, sheet metal, composite materials, and other materials, etc. For example by means of casting and/or forming, it is possible for the support structure 2 to transition integrally into the speaker basket 7.1, 7.2 and form the latter in order to thus achieve a one-piece design.

The invention claimed is:
1. A headrest for a seat comprising:
a support structure for supporting a person's head;
at least one speaker basket for a speaker provided on the support structure, wherein the support structure is manufactured integrally with the at least one speaker basket and forms the speaker basket in a seamless, one-piece design, and
a mount, which has at least one mounting element for fastening the headrest to at least one support for fastening the headrest to the seat,
wherein the support structure forms the at least one mounting element and transitions integrally into the seamless, one-piece design.
2. The headrest according to claim 1, wherein the at least one speaker basket supports the at least one mounting element for fastening the support of the seat.

3. The headrest according to claim 2, wherein the mounting element adjoins a back side of the at least one speaker basket.

4. The headrest according to claim 2, wherein the support structure transitions integrally from the at least one speaker basket into the mounting element and forms the mounting element.

5. The headrest according to claim 2, wherein the mounting element forms a snap clip for accommodating and fastening the support.

6. The headrest according to claim 2, wherein the at least one speaker basket supports a plurality of mounting elements for fastening the support.

7. The headrest according to claim 1, wherein the at least one speaker basket includes two speaker baskets, and the support structure is manufactured integrally with the two speaker baskets in a one-piece design, which two speaker baskets are positioned in opposite edge regions of the support structure.

8. The headrest according to claim 7, wherein the two speaker baskets each support a mounting element for fastening a support.

9. The headrest according to claim 8, wherein the support extends in a loop shape from a first one of the two speaker baskets to a second one of the two speaker baskets and is fastened to the mounting elements supported by the two speaker baskets.

10. The headrest according to claim 1, wherein the support structure has at least a first mounting element and a second mounting element for fastening the headrest to a support, and at least one reinforcing rib, which forms a third mounting element for fastening the support.

11. The headrest according to claim 10, wherein the third mounting element is positioned between the first and second mounting elements, each of which is supported by the at least one speaker basket.

12. A seat with a headrest according to claim 1.

13. The headrest according to claim 1, wherein the support comprises a support rod or a seat back.

14. The headrest according to claim 1, wherein the seat is a vehicle seat.

15. The headrest according to claim 1, further comprising a support body positioned on the support structure.

16. The headrest according to claim 15, wherein the support body is composed of foam.

17. A headrest for a seat comprising:
a support structure for supporting a person's head;
at least one speaker basket for a speaker provided on the support structure, wherein the support structure is manufactured integrally with the at least one speaker basket and forms the speaker basket in a seamless, one-piece design; and
a support for fastening the headrest to the seat, wherein the support structure and the support together transition integrally into the seamless, one-piece design.

18. The headrest according to claim 17, wherein the at least one speaker basket includes two speaker baskets, and the support structure is manufactured integrally with the two speaker baskets in a one-piece design, which two speaker baskets are positioned in opposite edge regions of the support structure.

19. The headrest according to claim 17, wherein the support comprises a support rod or a seat back.

20. The headrest according to claim 17, wherein the seat is a vehicle seat.

* * * * *